(12) United States Patent
Rhee et al.

(10) Patent No.: US 6,421,400 B1
(45) Date of Patent: Jul. 16, 2002

(54) SYSTEM AND METHOD USING POLAR COORDINATE REPRESENTATION FOR QUANTIZATION AND DISTANCE METRIC DETERMINATION IN AN M-PSK DEMODULATOR

(75) Inventors: Dojun Rhee, San Jose; Advait Mogre, Fremont, both of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/244,596

(22) Filed: Feb. 4, 1999

(51) Int. Cl.[7] .............................. H03D 3/22; H04L 27/22
(52) U.S. Cl. ...................... 375/329; 375/341; 375/265; 714/792; 714/795
(58) Field of Search ................................. 375/329, 341, 375/265, 326; 329/307; 714/792, 795

(56) References Cited

U.S. PATENT DOCUMENTS 5,754,600 A * 5/1998 Rahnema .................... 375/341
5,838,728 A * 11/1998 Alamouti et al. ........... 375/265
6,289,487 B1 * 9/2001 Hessel et al. ................ 714/795

* cited by examiner

*Primary Examiner*—Stephen Chin
*Assistant Examiner*—Heechul Kim
(74) *Attorney, Agent, or Firm*—Conley, Rose & Tayon

(57) ABSTRACT

A digital communications receiver is provided with a PSK demodulator and a soft-decision decoder. The PSK demodulator is configured to accept a receive signal and responsively produce quantized baseband signal components which include a quantized radial component $R_Q$ and a quantized angular component $\theta_Q$. The soft-decision decoder is coupled to the PSK demodulator to receive the quantized baseband signal components and is configured to convert the quantized signal components into decoded information bits. The soft-decision decoder preferably uses a squared Euclidean distance metric calculation for the decoding process. Using polar coordinate quantization provides an improved performance relative to Cartesian coordinate quantization. A new distance metric for TCM decoding is also provided which requires less implementation complexity than a standards Euclidean distance metric calculation, and which suffers no significant performance loss.

4 Claims, 7 Drawing Sheets

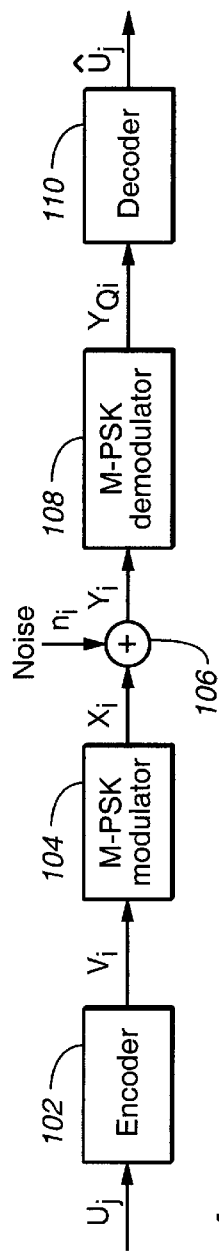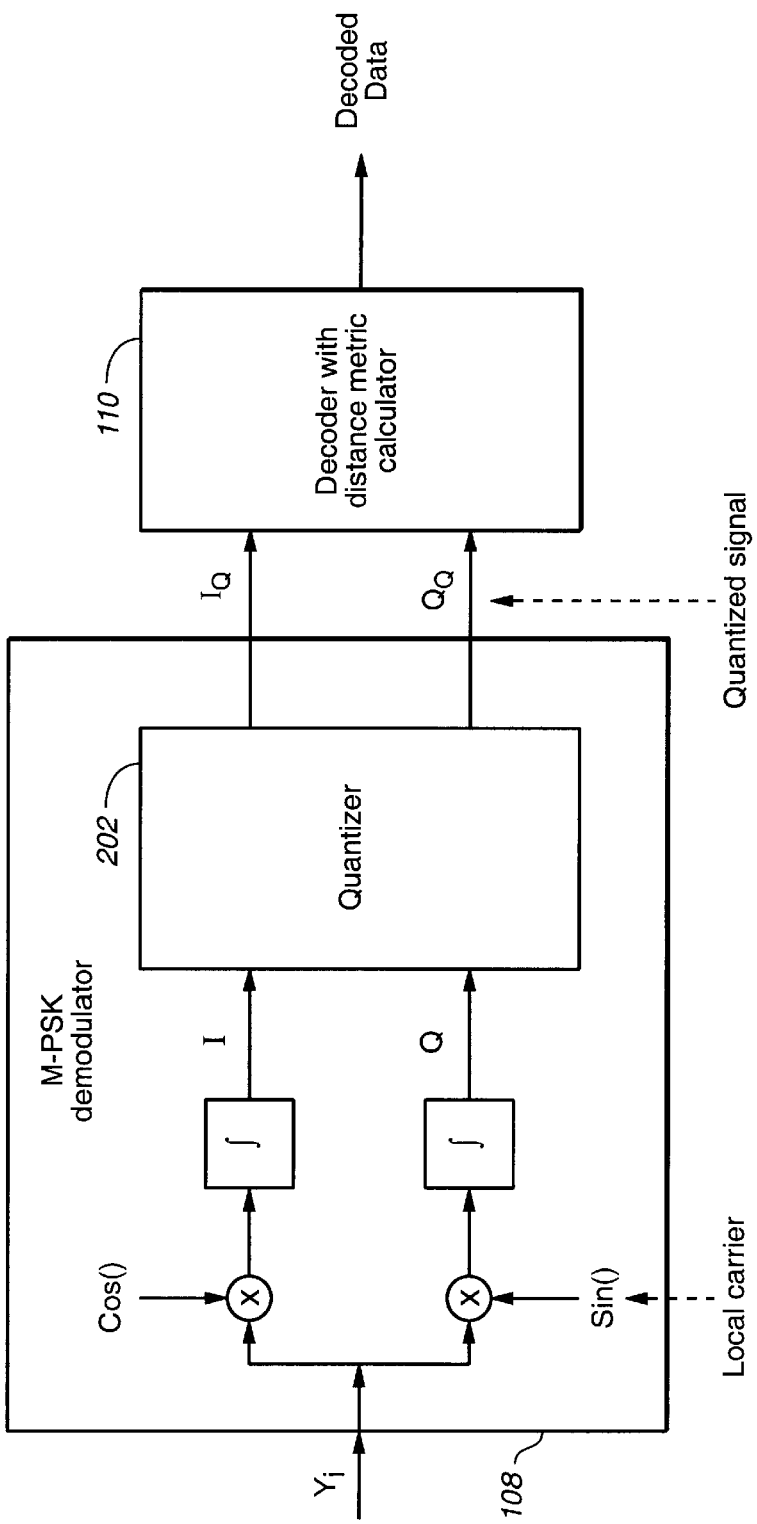

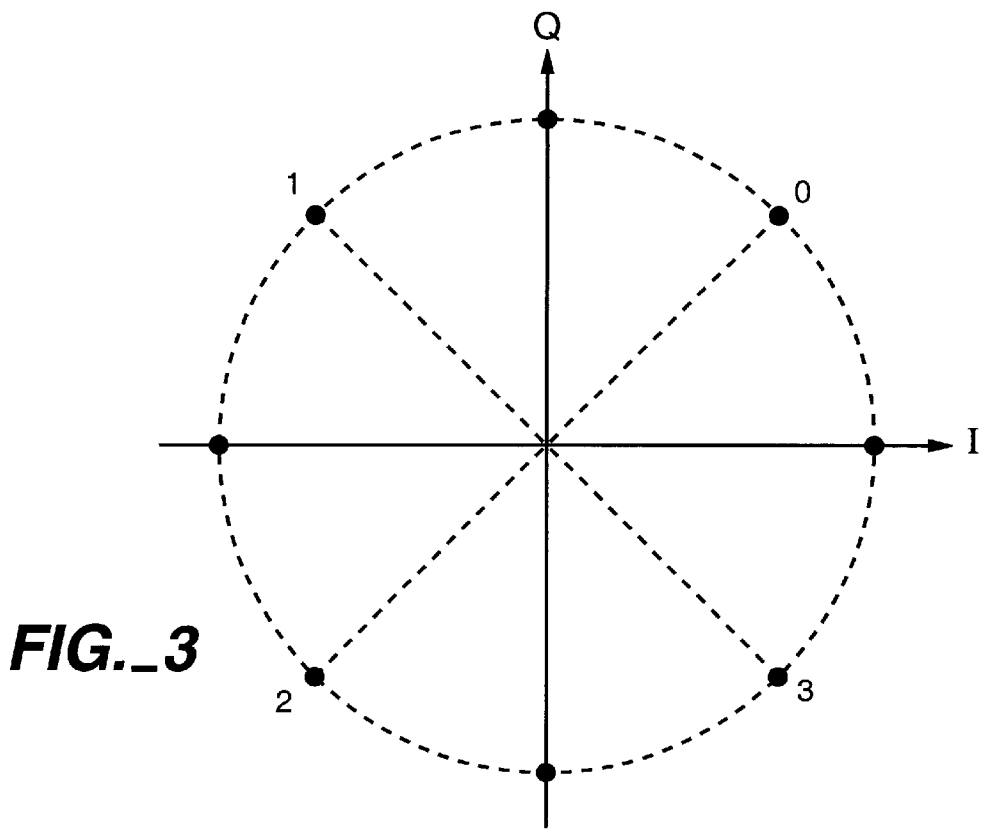
FIG._3
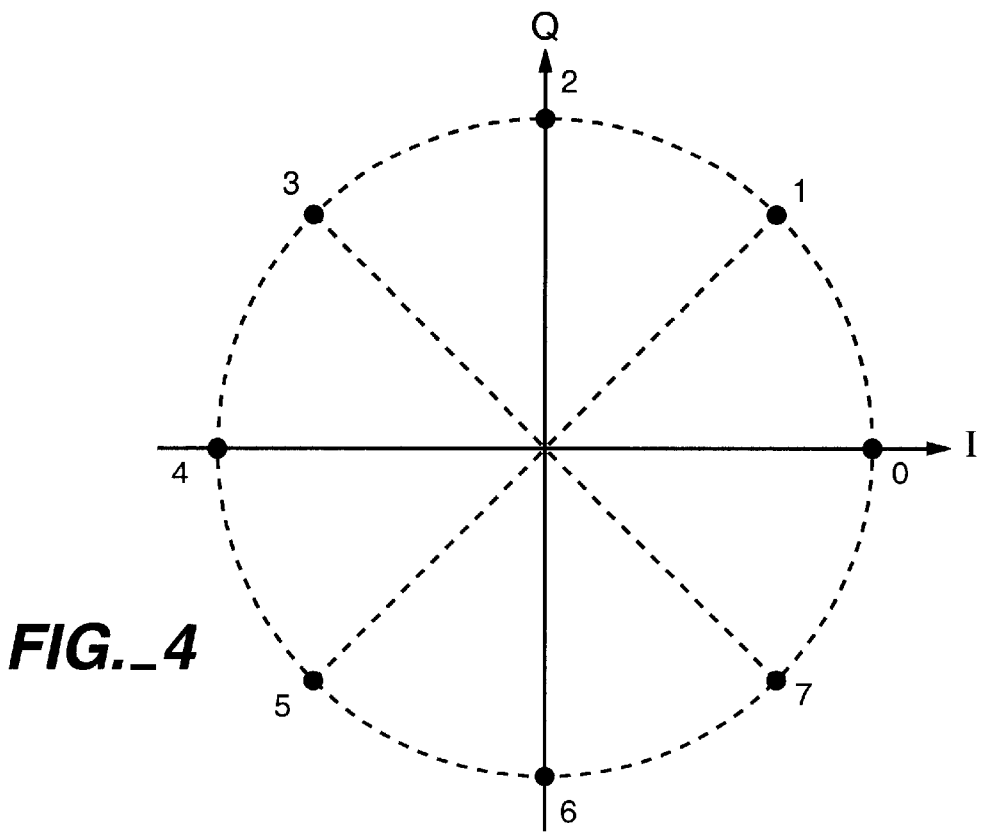
FIG._4

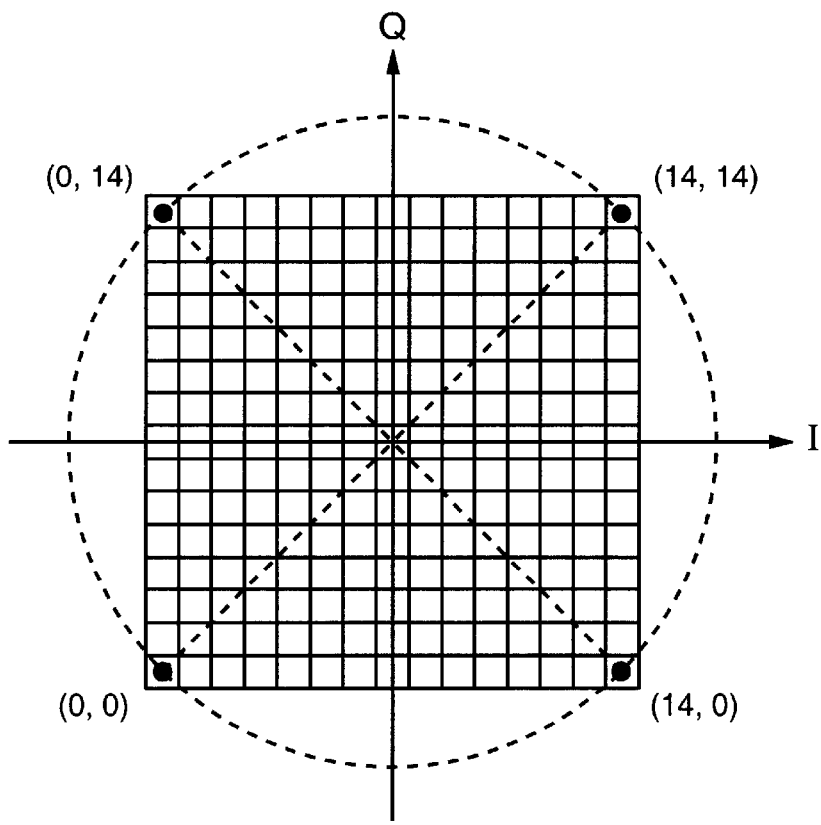
FIG._5
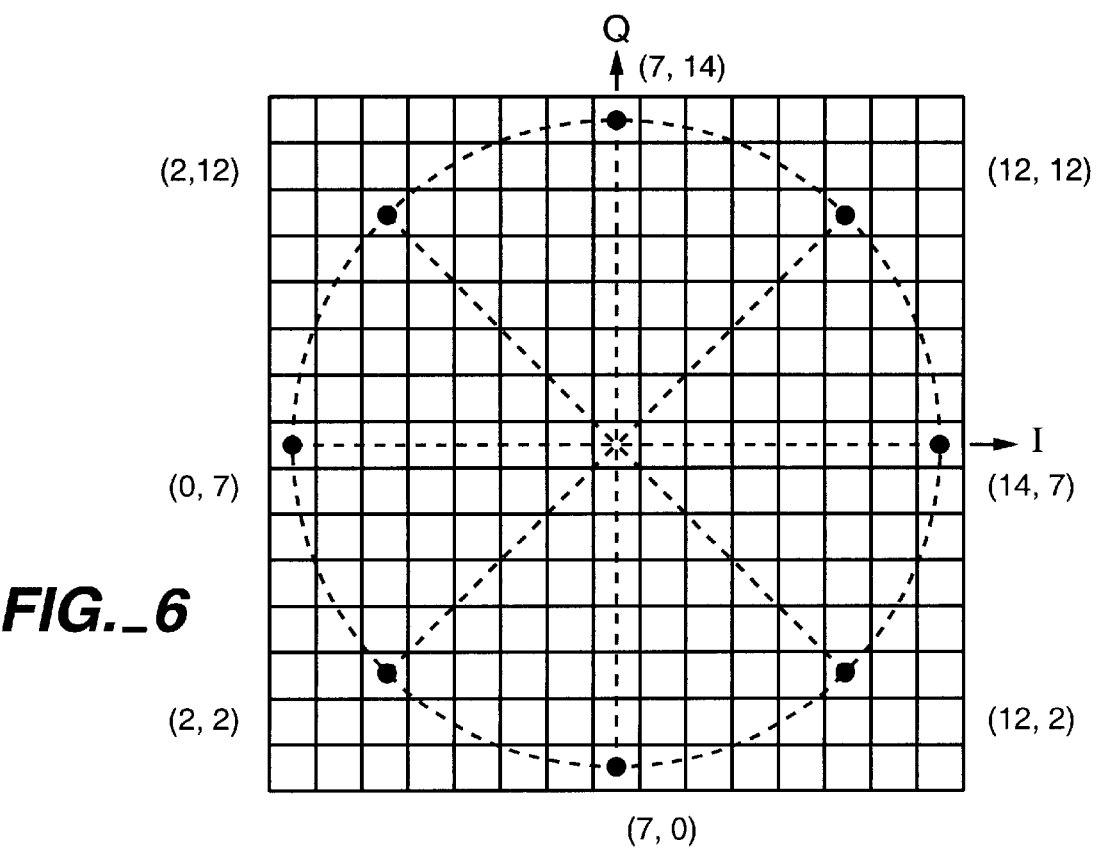
FIG._6

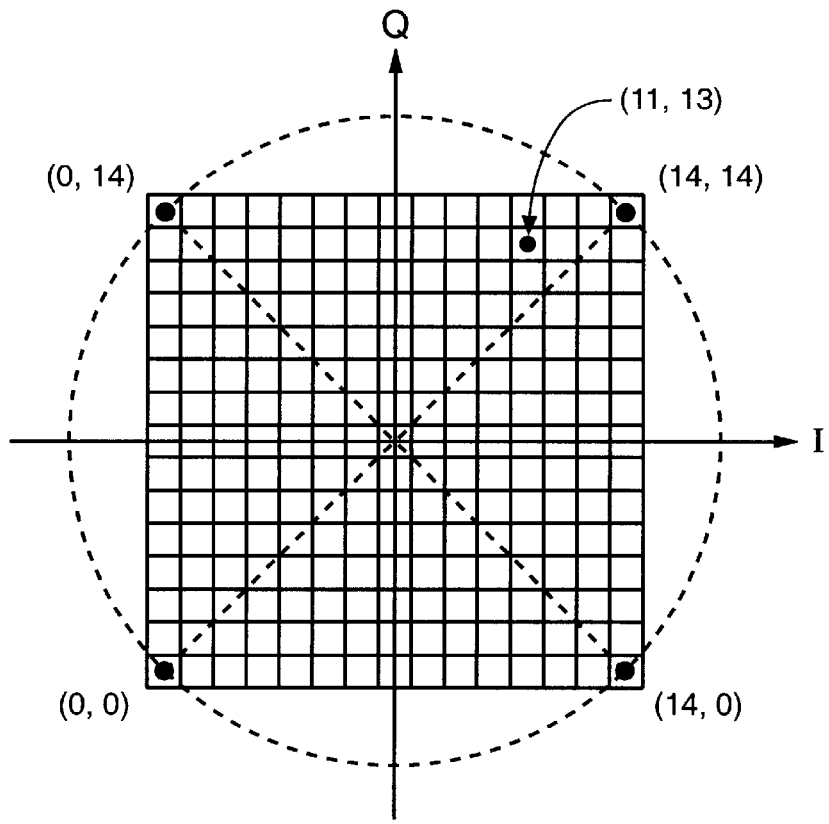
FIG._7
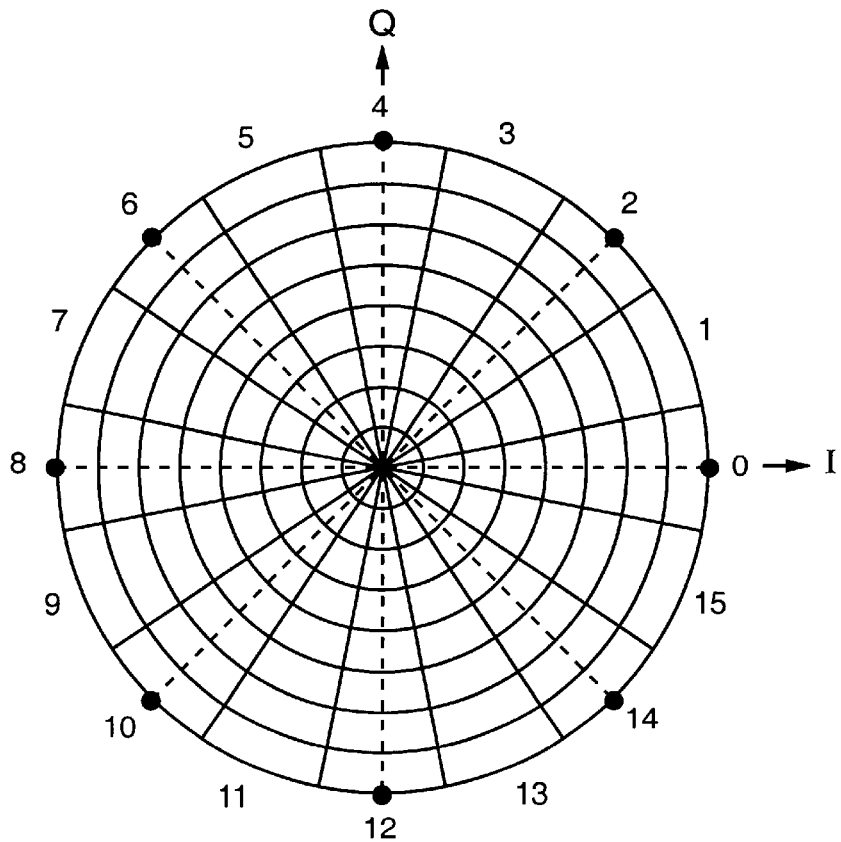
FIG._9

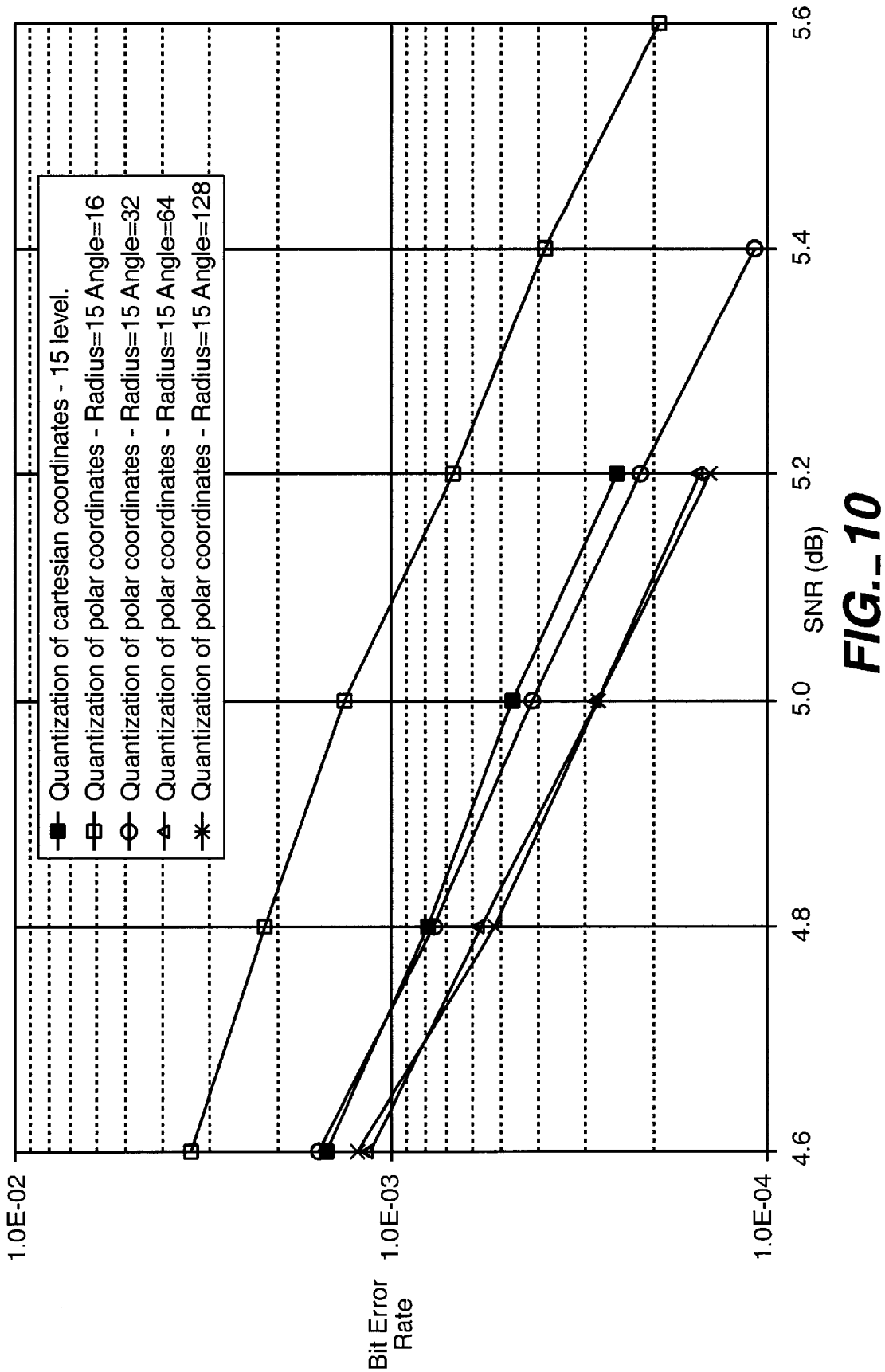
FIG._10

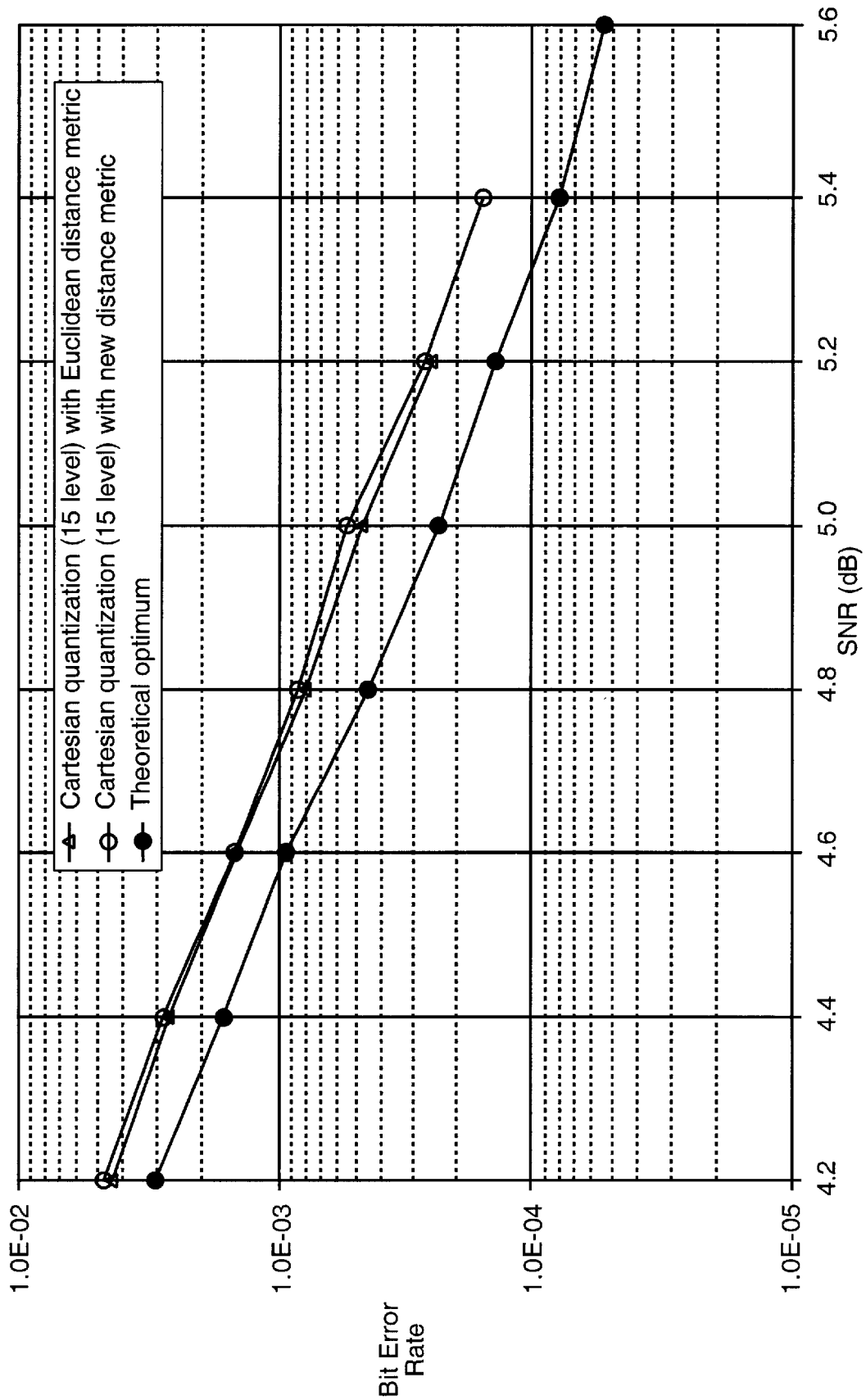
FIG._11

SYSTEM AND METHOD USING POLAR COORDINATE REPRESENTATION FOR QUANTIZATION AND DISTANCE METRIC DETERMINATION IN AN M-PSK DEMODULATOR

BACKGROUND OF THE INVENTION

1. Field of the Invention

The present invention relates to communication systems that employ Phase Shift Keying (PSK) modulation. More particularly, the present invention relates to the use of improved techniques for quantization and distance metric determination in a demodulator for PSK-modulated communication system.

2. Description of the Related Art

M-phase PSK modulation is a technique commonly applied in communication systems. FIG. 1 shows a typical model for a communication channel employing PSK modulation. The channel includes an encoder 102, a PSK modulator 104, a PSK demodulator 108, and a soft-decision decoder 110. At the transmitter end, encoder 102 encodes user data $U_j$ to provide protection against errors. The encoded data $V_i$ is modulated onto a carrier signal using phase modulation. In other words, the data symbol $V_i$ is coded as one of M phases (relative to a reference phase of a constant frequency signal), so that during time period i, the carrier signal has a phase angle $\angle X_i$ which corresponds to the data symbol $V_i$. As the phase-modulated carrier signal travels from the transmitter to the receiver, it experiences various forms of interference. In the model of FIG. 1, the interference $n_i$ is modeled as an additive noise source 106. The corrupted phase-modulated carrier signal $Y_i$ is received by demodulator 108 which determines a quantized signal $Y_{Qi}$ that most closely corresponds to the signal $Y_i$. The quantized signal $Y_{Qi}$ is recovered through the use of a reference phase generator by comparing received symbols with the reference phase. Soft-decision decoder 110 then decodes the quantized encoded data signal $Y_{Qi}$ to determine an error-corrected estimate $\hat{U}_j$ of the original user data.

As part of the decoding process, the soft-decision decoder 110 calculates a set of distance metrics for each quantized encoded data signal $Y_{Qi}$. A distance metric is a measurement of how "close" the quantized data signal $Y_{Qi}$ is to valid constellation signal points. Common distance metrics are discussed further below.

When encoder 102 is a trellis encoder, soft-decision decoder 110 is typically a Viterbi decoder. A Viterbi decoder tracks the most likely receive signal sequences through multiple trellis stages, and compiles sums of distance metrics to determine path weights indicating the relative likelihood of the most likely receive signal sequences. After a predetermined number of trellis stages, the Viterbi decoder will begin rendering decoding decisions. The decoding decisions $\hat{U}_j$ correspond to an allowable sequence of encoded symbols $V_i$ which are "closest to" the quantized signal sequence $Y_{Qi}$. Accordingly, the quantization method and the distance measurement method both affect the performance of trellis code modulated (TCM) systems. Details on maximum-likelihood decoding and the Viterbi algorithm can be found in many standard textbooks, including J. G. Proakis, *Digital Communications*: 2ed, McGraw-Hill Book Company, New York, N.Y., (c) 1989, pp. 454–459 and 610–616.

As shown in FIG. 2, demodulator 108 typically mixes the received signal $Y_i$ with a local carrier to produce In-phase ("I") and Quadrature-phase ("Q") baseband signals. The I and Q signals are used for phase comparison with the local carrier to identify encoded data symbols in the M-signal constellation. FIG. 2 shows the demodulator 108 and the decoder 110 at the receiver end. The phase comparison is typically done by first quantizing the I and Q coordinates into one of a number of discrete levels. Quantizer 202 maps the received I and Q signals to one of these discrete quantization levels. The quantized I and Q signals, $I_Q$ and $Q_Q$, respectively, are then compared by the decoder 110 with the I and Q signals corresponding to the data symbols in the M-signal constellation.

Examples of PSK constellations are shown in FIG. 3 and FIG. 4. The constellation signal points each represent one encoded data symbol. The phase angle of the constellation signal points is measured in degrees from the in-phase (I) axis. FIG. 3 shows a 4-signal PSK constellation, and FIG. 4 shows an 8-signal PSK constellation. These constellations provide 4 phases and 8 phases, respectively, for conveying data symbols from the transmitter to the receiver.

Some VLSI implementations of quantizers in M-PSK demodulator use Cartesian coordinates as a means of quantizing I and Q signals. The Cartesian quantization method is equivalent to dividing the signal constellation space into a grid pattern. FIG. 5 shows a 15-level quantization of the 4-signal PSK constellation. The received I signal is quantized to one of 15 amplitude levels numbered from 0 to 14, and the received Q signal is similarly quantized. The quantization levels are spaced such that the 4 PSK signal points are at the corners of the grid.

FIG. 6 shows a 15-level quantization of the 8-signal PSK constellation. Again, the I and Q signals are each quantized to one of 15 amplitude levels numbered from 0 to 14. Here, the quantization levels are spaced so that the four signals on the I and Q axes are at the edges of the grid. After the I and Q signals have been mapped to one of the squares in the quantization grid, distance calculations to the signal points may be performed and used by the decoder to determine a most likely symbol sequence.

Metrics commonly used to calculate distance between two signal points in an M-PSK modulated system are squared Euclidean distance and absolute distance. FIG. 7 shows a received signal point quantized at (11,13). The absolute distance between (11,13) and the nearest data symbol (14, 14) is:

$$|11-14|+|13-14|=4$$

whereas the squared Euclidean distance is:

$$(11-14)^2+(13-14)^2=10.$$

In general, the absolute distance calculation is simpler to implement than the squared Euclidean distance calculation for digital implementations in VLSI. However, using the absolute distance in an 8-signal PSK constellation increases the error rate of the decoder. FIG. 8 shows the bit error rate (BER) as a function of the signal-to-noise ratio (SNR) for an 8-signal PSK TCM system. The system which uses absolute distance metric has a higher BER than the system which uses the Euclidean distance metric. The difference in performance between the two metric methods can be measured in terms of the change in SNR necessary to produce an equivalent performance. From FIG. 8 it is observed that to achieve the same BER, a system using the absolute distance metric requires a SNR that is at least 0.25 dB higher than the system using the squared Euclidean distance metric. In other words, for an 8-signal PSK constellation, use of the absolute distance metric translates into a 0.25 dB loss in SNR relative to use of the Euclidean distance metric in 15-level Cartesian coordinate quantization.

While the Euclidean distance metric may provide a lower Bit Error Rate, the mathematical computations associated with the calculation of the Euclidean distance make this metric expensive to implement for VLSI applications. Thus, what is needed is an apparatus and method for performing quantization and using computationally efficient distance metrics without incurring significant performance losses.

SUMMARY OF THE INVENTION

Generally speaking, the present invention fills these needs by providing improved quantization methods and improved distance metrics for a PSK demodulator/decoder. It should be appreciated that the present invention can be implemented in numerous ways, including implementation as a process, an apparatus, a system, a device, or a method. Several inventive embodiments of the present invention are described below.

In one embodiment, the present invention provides a digital communications receiver which includes a PSK demodulator and a soft-decision decoder. The PSK demodulator is configured to accept a receive signal and responsively produce quantized baseband signal components which include a include a quantized radial component $R_Q$ and a quantized angular component $\theta_Q$. The soft-decision decoder is coupled to the PSK demodulator to receive the quantized baseband signal components and is configured to convert the quantized signal components into decoded information bits. The soft-decision decoder preferably uses a squared Euclidean distance metric calculation for the decoding process. Using polar coordinate quantization provides an improved performance relative to Cartesian coordinate quantization.

In another embodiment, the present invention provides a digital communications receiver which comprises a PSK demodulator and a soft-decision decoder. In this embodiment, the PSK produces quantized in-phase signal component $I_Q$ and quantized quadrature signal component $Q_Q$. The soft-decision decoder receives the quantized signal components and converts the quantized signal components into decoded information bits using a new distance metric calculation. The new distance metric calculation is based on a polar coordinate expression of Euclidean distance, but requires less implementation complexity than a standard Euclidean distance metric calculation.

Advantageously, the present invention provides the benefit of PSK TCM decoding by quantizing signal components using polar coordinates. Improved distance metrics acting upon these quantized values result in a more accurate, efficient and reliable decoding process. Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1 shows a functional block diagram of a trellis code modulated (TCM) phase-shift key (PSK) communications system;

FIG. 2 shows a functional block diagram of a PSK demodulator;

FIG. 3 shows a 4-signal PSK signal constellation;

FIG. 4 shows an 8-signal PSK signal constellation;

FIG. 5 shows a 15×15 level Cartesian coordinate quantization grid for a 4-signal PSK signal constellation;

FIG. 6 shows a 15×15 level Cartesian coordinate quantization grid for a 8-signal PSK constellation;

FIG. 7 shows the quantization of a received signal in a 15×15 level Cartesian coordinate quantization grid;

FIG. 9 shows an 8×16 level polar coordinate quantization grid for an 8-signal PSK constellation;

FIG. 10 shows simulation results for comparing system performance using various polar coordinate quantizations; and FIG. 11 shows simulation results for comparing system performance using a new distance metric versus the Euclidean distance metric.

Figure 8:
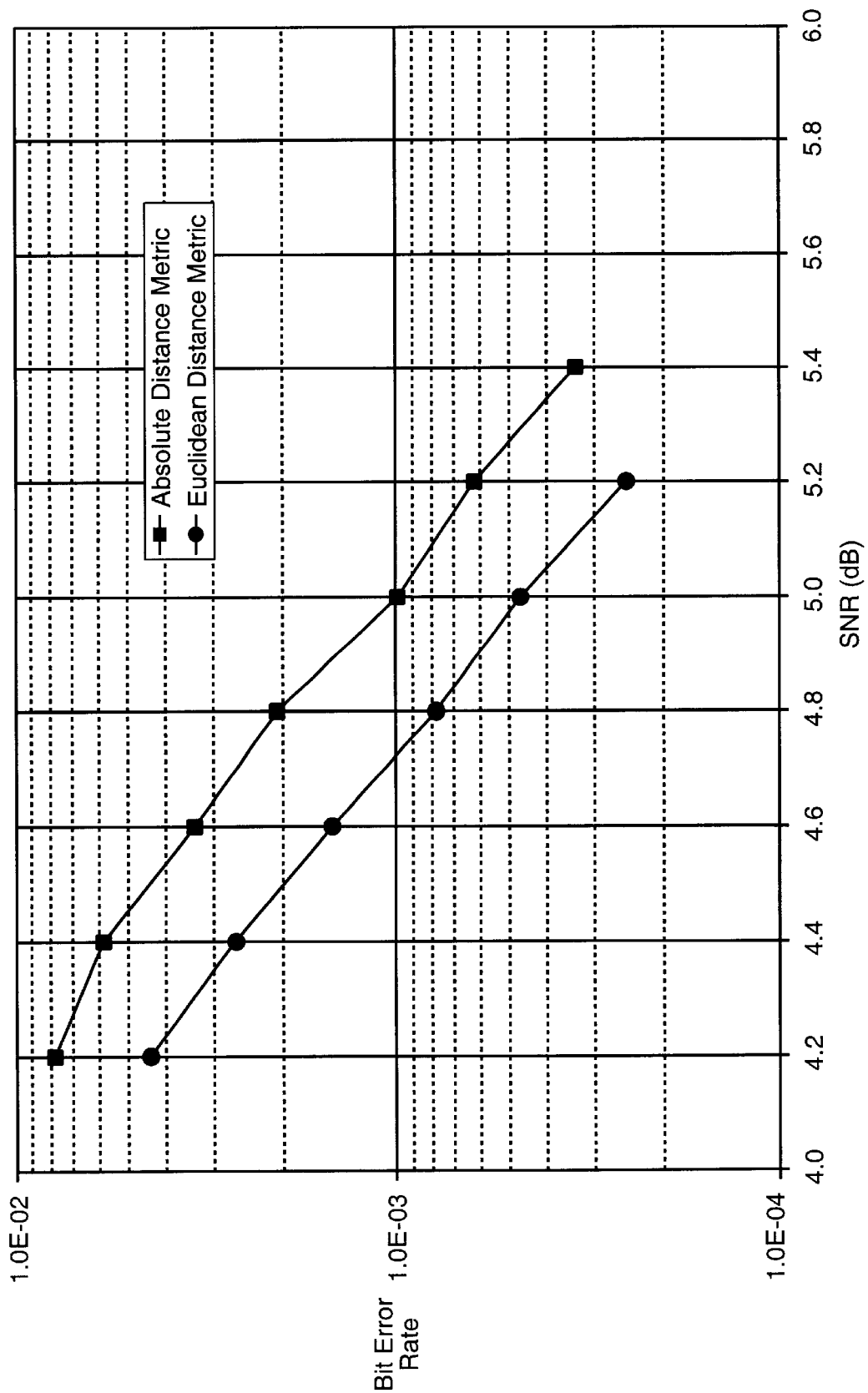
FIG. 8 shows simulation results for comparing system performance using absolute distance metric versus Euclidean distance metric.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in present invention.

Quantization of Polar Coordinates and Use of Euclidean Distance Metric

Referring back to FIGS. 3 and 4, the PSK constellation can be expressed in terms of the in-phase (I) and quadrature phase (Q) signal components. Alternatively, the PSK constellation (and any received signal) can be expressed in terms of a radius R and an angle θ. These may be related to the I,Q components as follows:

$$R = \sqrt{I^2 + Q^2}$$

$$\theta = \begin{cases} \tan^{-1}(Q/I), & \text{if } I > 0 \\ \tan^{-1}(Q/I) + 180° \text{ C.}, & \text{if } I < 0 \end{cases}$$

The radius R of a received signal may be quantized into one of L levels, where L is a predetermined number. The angle θ of a received signal may be quantized into one of K of levels, where K is a second predetermined number. As an example, FIG. 9 shows a polar coordinate quantization grid for an 8-signal PSK constellation. In FIG. 9, the number of radial quantization levels L is 8 and the number of angular quantization levels K is 16.

Let the received signal point be denoted by $(R, \theta)$. The squared Euclidean distance $D_i^2$ between a received signal point $(R, \theta)$ and a PSK constellation signal point $(R_i, \theta_i)$ can be computed by using the following equation:

$$D_i^2 = R^2 + R_i^2 - 2RR_i \cos(\theta - \theta_i) \quad (1)$$

For an 8-signal PSK constellation, the index i ranges from 0 to 7 (see FIG. 4). In general for an M-signal PSK constellation, the index i ranges from 0 to M−1.

Referring back to FIG. 2, the quantizer 202 converts the I and Q signals into quantized radius $R_Q$ and angle $\theta_Q$ signals (not shown). In one embodiment, this is done by first determining the quantized I and Q signals ($I_Q$ and $Q_Q$), then using the quantized I and Q signals to perform a table lookup to find the corresponding quantized radius $R_Q$ and angle $\theta_Q$ signals. The decoder 110 then uses $R_Q$ and $\theta_Q$ with equation (1) to determine squared Euclidean distances to each of the PSK signal constellation points. The decoder 110 then uses the calculated distance metrics in a standard way (e.g. Viterbi algorithm) to decode the received signal.

FIG. 10 shows simulation performance results for an 8-signal PSK TCM system using polar quantization and the Euclidean distance metric. BER performance curves are shown for various angular quantizations including 16, 32, 64 and 128 angular levels. The radial quantization is held constant at 15 levels. The BER performance curve for the 15-level Cartesian quantization system using the Euclidean distance metric is also provided for comparison.

From FIG. 10 it is evident that as the number of angular quantization levels increases, the BER decreases. After the number of angular quantization levels reaches 64, further increases in the number of quantization levels yields little or no improvement. The 15-radial, 64-angular level polar quantization system is observed to outperform the 15-level Cartesian quantization system using the squared Euclidean distance metric by almost 0.2 dB. This gain may be added to the 0.25 dB gain observed in FIG. 8 to yield a total system improvement of over 0.4 dB relative to the 15-level Cartesian quantization system using the absolute value distance metric.

It can be concluded that systems employing polar coordinate quantization offer a performance improvement over systems employing Cartesian coordinate quantization, as long as a greater number of angular quantization levels are provided. However, the complexity of a straightforward implementation may be impractical.

Use of a New Distance Metric

In the decoder, the received signal $(R, \theta)$ is compared with the PSK constellation signal points $(R_i, \theta_i)$. The squared Euclidean distance of the received signal from these points is denoted by $D_i^2$.

$$D_i^2 = R^2 + R_i^2 - 2RR_i \cos(\theta - \theta_i)$$

In the decoder, the $D_i^2$ metrics for i=0 to M−1 will be compared to find the nearest PSK constellation signal point. Since $R_i$ is the same for all values of i, and $R^2$ is a common term for all $D_i^2$, the metric comparison is not affected by removing these terms. The remaining term may further by scaled by ½ without affecting the comparison. Consequently, a new distance metric can be used:

$$\hat{D}_i = -R \cos(\theta - \theta_i)$$

The PSK constellation signal point having the smallest $\hat{D}_i$ is the most probable symbol. Given a quantized receive signal $(R_Q, \theta_Q)$, this distance metric requires one subtraction, one lookup, and one multiplication to calculate.

The new distance metric can be expressed in terms of the I and Q components of the received signal point. Since $$\cos(\theta - \theta_i) = \cos(\theta)\cos(\theta_i) + \sin(\theta)\sin(\theta_i) \text{ and}$$

$$\cos(\theta) = \frac{I}{R} \text{ and}$$

$$\sin(\theta) = \frac{Q}{R}$$

the new distance metric can be rewritten:

$$\hat{D}_i = -R\left(\left(\frac{I}{R}\right)\cos(\theta_i) + \left(\frac{Q}{R}\right)\sin(\theta_i)\right)$$

$$\hat{D}_i = -I \cos(\theta_i) - Q \sin(\theta_i) \quad (2)$$

It is noted that $-\cos(\theta_i)$ and $-\sin(\theta_i)$ are fixed constants for a given signal point i. Given a quantized receive signal $(I_Q, Q_Q)$, computing each distance metric using equation (2) involves only one addition and two multiplication operations.

Refering back to FIG. 2, the quantizer 202 converts the I and Q signals into quantized signals $I_Q$ and $Q_Q$. The decoder 110 then uses the quantized signals with equation (2) to determine new distance metrics to each of the PSK signal constellation points. The decoder uses these distance metrics in a standard way to decode the received signal.

FIG. 11 shows simulation performance results for an 8-signal PSK TCM system using 15-level Cartesian quantization with the new distance metric. BER performance curves are also shown for the same system using a squared Euclidean distance metric, and the theoretical optimum system (no quantization and squared Euclidean distance). It is observed that there is no significant degradation between the systems using the new distance metric and the squared Euclidean distance metric, and that both systems are within 0.25 dB of the theoretical optimum. Increasing the number of quantization levels will further improve the system performance.

It can be concluded that systems employing the new distance metric offer performance equivalent to the systems employing the Euclidean distance, at a greatly reduced implementation complexity.

Numerous variations and modifications will become apparent to those skilled in the art once the above disclosure is fully appreciated. It is intended that the following claims be interpreted to embrace all such variations and modifications.

What is claimed is:

1. A digital communications receiver which comprises:
   a phase-shift key (PSK) demodulator configured to accept a receive signal and configured to responsively produce quantized signal components, wherein the quantized signal components include a quantized in-phase component $I_Q$ and a quantized quadrature component $Q_Q$; and
   a soft-decision decoder coupled to the PSK demodulator to receive the quantized signal components and configured to convert the quantized signal components into decoded information bits, wherein the soft-decision decoder includes:
   a distance metric calculator configured to receive the quantized signal components and responsively determine a distance metric for each PSK signal constellation point, wherein the distance metric $D_i^2$ for a PSK signal constellation point ($R_i$, $\theta_i$) is calculated according to the equation:

$$D_i^2 = -I_Q \cos(\theta_i) - Q_Q \sin(\theta_i).$$

2. The digital communications receiver of claim 1, wherein the PSK demodulator includes:

a downconverter configured to mix the receive signal with a local carrier signal to produce baseband signal components, wherein the baseband signal components include an in-phase signal component and a quadrature-phase signal component; and a quantizer coupled to the downconverter to receive the baseband signal components and configured to quantize the baseband signal components.

3. A method for decoding trellis code modulated (TCM) phase-shift keyed (PSK) signals, wherein the method comprises:

receiving an in-phase component signal I and a quadrature-phase signal Q;

quantizing the I signal into one of L quantization levels to produce a quantized in-phase component signal $I_Q$;

quantizing the Q signal into one of L quantization levels to produce a quantized quadrature component signal $Q_Q$; and calculating a distance metric $D_i$ from the quantized component signals ($I_Q$, $Q_Q$) to each PSK signal constellation point ($R_i$, $\theta_i$), according to the equation:

$$D_i = -I_Q \cos(\theta_i) - Q_Q \sin(\theta_i).$$

4. The method of claim 3, further comprising:

determining path weights by adding distance metrics; and rendering decoder decisions by comparing path weights to determine a most likely path.

* * * * *